(12) United States Patent
Nelson et al.

(10) Patent No.: US 12,311,851 B1
(45) Date of Patent: May 27, 2025

(54) WATERCRAFT BATTERY SWITCH SYSTEM WITH VISUAL INDICATOR

(71) Applicant: T-H Marine Supplies, LLC, Huntsville, AL (US)

(72) Inventors: John Logan Nelson, Fort Myers, FL (US); Chris Drahman, Huntsville, AL (US); Eric Griggs, Huntsville, AL (US); Kelvin Campbell, Huntsville, AL (US); Scott David Spetich, Fort Myers, FL (US); Corey Richard Williams, Madison, AL (US)

(73) Assignee: T-H Marine Supplies, LLC, Huntsville, AL (US)

( * ) Notice: Subject to any disclaimer, the term of this patent is extended or adjusted under 35 U.S.C. 154(b) by 288 days.

(21) Appl. No.: 18/113,146

(22) Filed: Feb. 23, 2023

Related U.S. Application Data

(60) Provisional application No. 63/313,142, filed on Feb. 23, 2022.

(51) Int. Cl.
*B60R 16/00* (2006.01)
*B60K 35/00* (2024.01)
*B60K 35/10* (2024.01)
*B60K 35/28* (2024.01)
*B60R 16/033* (2006.01)
*B63B 69/00* (2013.01)

(52) U.S. Cl.
CPC ............ *B60R 16/005* (2013.01); *B60K 35/00* (2013.01); *B60R 16/033* (2013.01); *B63B 69/00* (2013.01); *B60K 35/10* (2024.01); *B60K 35/28* (2024.01); *B60K 2360/126* (2024.01); *B60K 2360/169* (2024.01); *B60K 2360/332* (2024.01); *B60K 2360/46* (2024.01)

(58) Field of Classification Search
None
See application file for complete search history.

(56) References Cited

U.S. PATENT DOCUMENTS

| | | | |
|---|---|---|---|
| 2021/0055806 A1* | 2/2021 | Shepelev | B60K 35/10 |
| 2021/0284085 A1* | 9/2021 | Lee | B60R 11/0229 |
| 2022/0105832 A1* | 4/2022 | Lee | B60K 35/81 |

* cited by examiner

*Primary Examiner* — Jared Fureman
*Assistant Examiner* — Joel Barnett
(74) *Attorney, Agent, or Firm* — Bradley Arant Boult Cummings LLP; Stephen H. Hall; Jessica L. Zurlo

(57) ABSTRACT

A watercraft battery switch system with visual indicator may have a multi-position, physical rotary switch with integrated LED lighting to visually indicate to a watercraft user information about the watercraft's batteries. In an embodiment, the battery switch system may indicate whether the watercraft's batteries are in use and what combination of batteries is currently powering one or more of the watercraft's systems.

20 Claims, 16 Drawing Sheets

WATERCRAFT BATTERY SWITCH SYSTEM WITH VISUAL INDICATOR

CROSS-REFERENCE TO RELATED APPLICATIONS

This application claims the benefit of and priority to U.S. Provisional Application No. 63/313,142, filed on Feb. 23, 2022, and entitled "Watercraft Battery Switch System with Visual Indicator," the disclosure of which is expressly incorporated by reference in its entirety.

FIELD

The present disclosure relates generally to watercraft power and control systems, and more specifically, to a watercraft battery switch system with a visual indicator for use therewith.

BACKGROUND

Watercraft require electrical power to operate various on-board systems such as lighting and engine ignition, and electrical power is commonly provided by batteries or banks of batteries. To conserve energy and to make boats safer by reducing fire hazards when they are not in operation, switches are used to disengage the boat's battery systems from the boat's main power or common supply cable when the ignition is turned off and the boat is not being used.

The batteries and their switches are frequently positioned in a portion of the watercraft that is away from passenger areas and inconvenient to access. For example, battery switches are often positioned in remote, dark areas of the watercraft, such as in the battery compartment or the bilge of the watercraft. Positioning battery switches on or near a control panel is expensive. In order to know which batteries are in use for a particular system, a user often needs to visually inspect the positions of switches for the batteries. Because the battery switches are often located in dark, obscure places of the watercraft, it may be inconvenient or impossible to determine whether a battery's switch is "on," especially in the early morning hours or in the evening when it is dark. It is also difficult to change the position of the switch while operating the watercraft.

Accordingly, there remains a need in the art for improved systems and methods for implementing watercraft battery switches.

SUMMARY

The problems expounded above, as well as others, are addressed by the following inventions, although it is to be understood that not every embodiment of the inventions described herein will address each of the problems described above.

In some embodiments, the present disclosure provides a switch system for a battery, the switch system including a switch including a visual indicator positioned thereon, wherein the visual indicator is configured to provide an indication of whether current from the battery is flowing through the switch; a controller coupled to the switch and the visual indicator, wherein the controller is configured to execute instructions stored in memory to: receive, at the controller, a switch position signal indicating a physical position of the switch; generate, at the controller, an indicator signal based on the switch position signal, wherein the indicator signal includes an indication that the visual indicator is to be turned on if current from the battery is flowing through the switch and the visual indicator is to be turned off if no current is flowing through the switch; and communicate, from the controller, the indicator signal to the visual indicator.

In one embodiment, the indicator signal further includes an indication of a color of the visual indicator if the visual indicator is to be turned on. In another embodiment, the visual indicator is a LED light source. In still another embodiment, the switch includes an input stud, the input stud configured to be operatively connected to a battery. In yet another embodiment, the switch includes an output stud, the output stud configured to be operatively connected to an output source. In still another embodiment, the output source includes a control panel, a starter, an alternator, or any combination of the foregoing.

In further embodiments, a switch system for a multi-battery powered watercraft is provided, the switch system including a switch including a selector knob configured for rotation to a plurality of positions, each position corresponding to one of a plurality of battery circuits; a visual indicator positioned on the switch, wherein the visual indicator is configured to provide an indication of whether current from at least one of the battery circuits is flowing through the switch; a controller coupled to the switch and the visual indicator, wherein the controller is configured to execute instructions stored in memory to: receive, at the controller, a switch position signal indicating the position of the selector knob; generate, at the controller, an indicator signal based on the switch position signal, wherein the indicator signal comprises an indication that the visual indicator is to be turned on if current from the selected battery circuit is flowing through the switch and an indication of a color of the visual indicator if the visual indicator is to be turned on; and communicate, from the controller, the indicator signal to the visual indicator.

In one embodiment, the visual indicator is a LED light source. In another embodiment, the visual indicator is configured to emit a different color for each selected battery circuit. In still another embodiment, the plurality of battery circuits includes a first circuit operatively connected to a first battery, a second circuit operatively connected to a second battery, a third circuit operatively connected to the first battery and the second battery, and an open circuit disconnected from both the first battery and the second battery. In still another embodiment, the switch system includes a battery charge indicator operatively connected to the switch. In yet another embodiment, the system has an Ingress Protection code of at least IP67. In another embodiment, the switch includes a faceplate, the faceplate including labels affixed thereto for each of the plurality of positions. In still another embodiment, the labels are raised off the faceplate by at least about one millimeter. In yet another embodiment, the switch further includes a first input stud configured to be operatively connected to the first battery to form the first circuit and a second input stud configured to be operatively connected to the second battery to form the second circuit.

In still further embodiments, a switch system for a multi-battery powered watercraft is provided, the switch system including a switch including a selector knob configured for rotation to a plurality of positions, each position corresponding to one of a plurality of battery circuits, the plurality of battery circuits including a first circuit operatively connected to a first battery, a second circuit operatively connected to a second battery, and a third circuit operatively connected to the first battery and the second battery; a light source positioned on the switch, wherein the light source is configured to provide an indication of whether current from at least one of the battery circuits is flowing through the switch; a controller coupled to the switch and the light source, wherein the controller is configured to execute instructions stored in memory to: receive, at the controller, a switch position signal indicating the position of the selector knob; generate, at the controller, an indicator signal based on the switch position signal, wherein the indicator signal includes an indication that the light source is to be turned on if current from the selected battery circuit is flowing through the switch and an indication of a color of the light source if the light source is to be turned on; and communicate, from the controller, the indicator signal to the light source.

In one embodiment, the light source is a LED light source. In another embodiment, the system has an Ingress Protection code of at least IP67. In still another embodiment, the light source is configured to emit a different color for each selected battery circuit. In yet another embodiment, the switch further includes a first input stud configured to be operatively connected to the first battery to form the first circuit and a second input stud configured to be operatively connected to the second battery to form the second circuit.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1A:
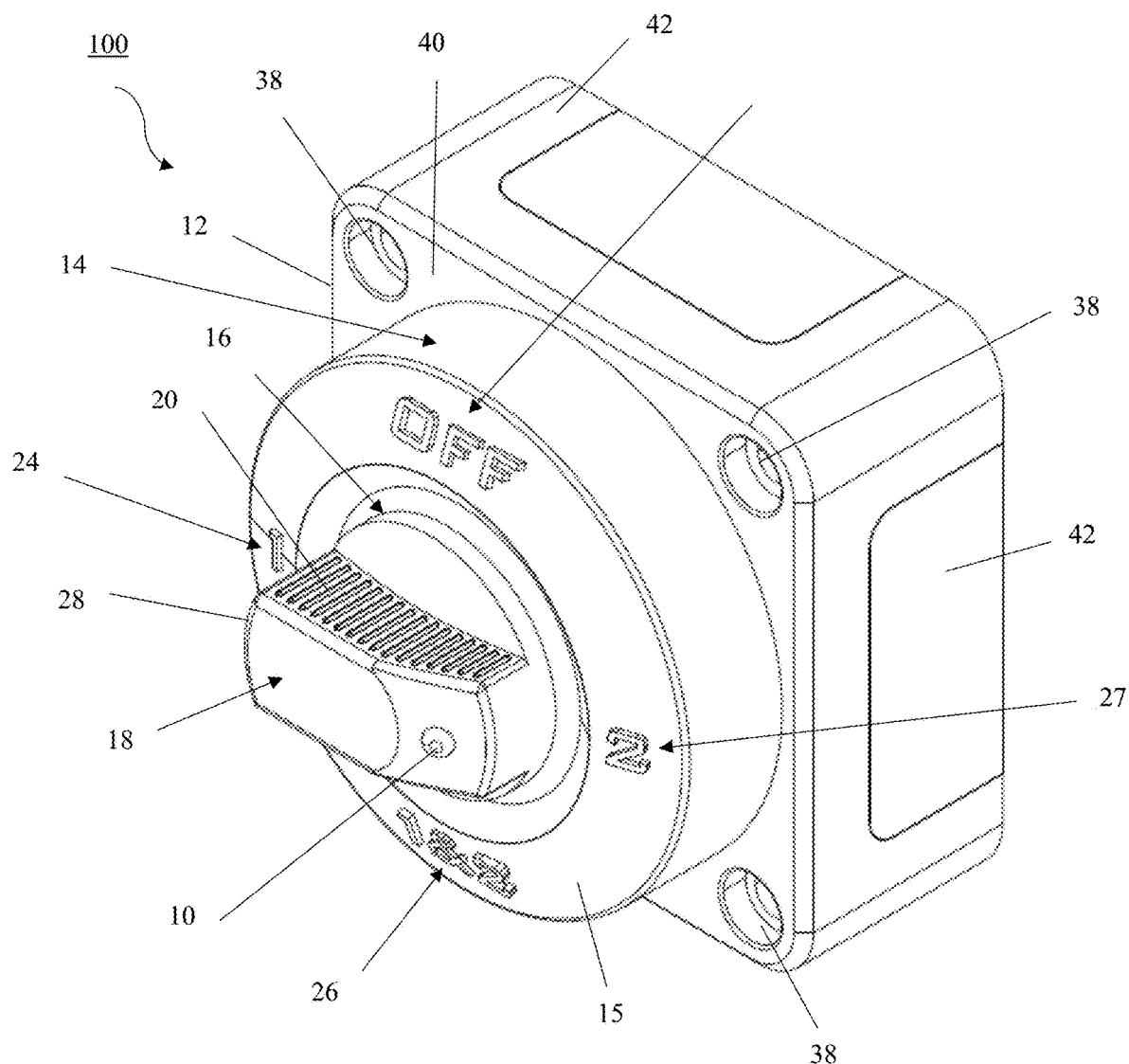
FIG. 1A is a front perspective view of a watercraft battery four-position switch system in accordance with one embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

It will be understood that when a feature or element is referred to as being "on" another feature or element, it can be directly on the other feature or element, or intervening features and/or elements may also be present. In contrast, when a feature or element is referred to as being "directly on" another feature or element, there are no intervening features or elements present. It will also be understood that, when a feature or element is referred to as being "connected," "attached," or "coupled" to another feature or element, it can be directly connected, attached, or coupled to the other feature or element, or intervening features or elements may be present. In contrast, when a feature or element is referred to as being "directly connected," "directly attached," or "directly coupled" to another feature or element, there are no intervening features or elements present. Although described or shown with respect to one embodiment, the features and elements so described or shown can apply to other embodiments.

Spatially relative terms, such as "above," "under", "below", "lower", "over", "upper" and the like, may be used herein for ease of description to describe one element or feature's relationship to another when the apparatus is right side up.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

The present disclosure provides battery switch systems for motorized watercraft, such as boats, including, for instance, center console boats, dual console boats, walkaround boats, power catamaran boats, pontoon boats, trawlers, convertible sportfishing boats, bay boats, flats, and skiffs; yachts; and ships. In particular, the watercraft battery switch systems of the present disclosure include a multi-position, physical rotary switch with an integrated visual indicator, such as LED lighting, to visually indicate to a watercraft user information about the watercraft's one or more batteries. In some embodiments, the watercraft battery switch system of the present disclosure can indicate whether the watercraft's one or more batteries are in use and what combination of batteries is currently powering one or more of the watercraft's systems. Advantageously, since most battery switches are placed in remote, dark areas of the watercraft, the battery switch of the present disclosure allows watercraft users to confirm the positioning of the switch and the status of the one or more batteries powering the watercraft's systems without having to physically access the obscure, hard-to-reach area or use a flashlight or other external lighting means to visually inspect the switch.

Figure 1B:
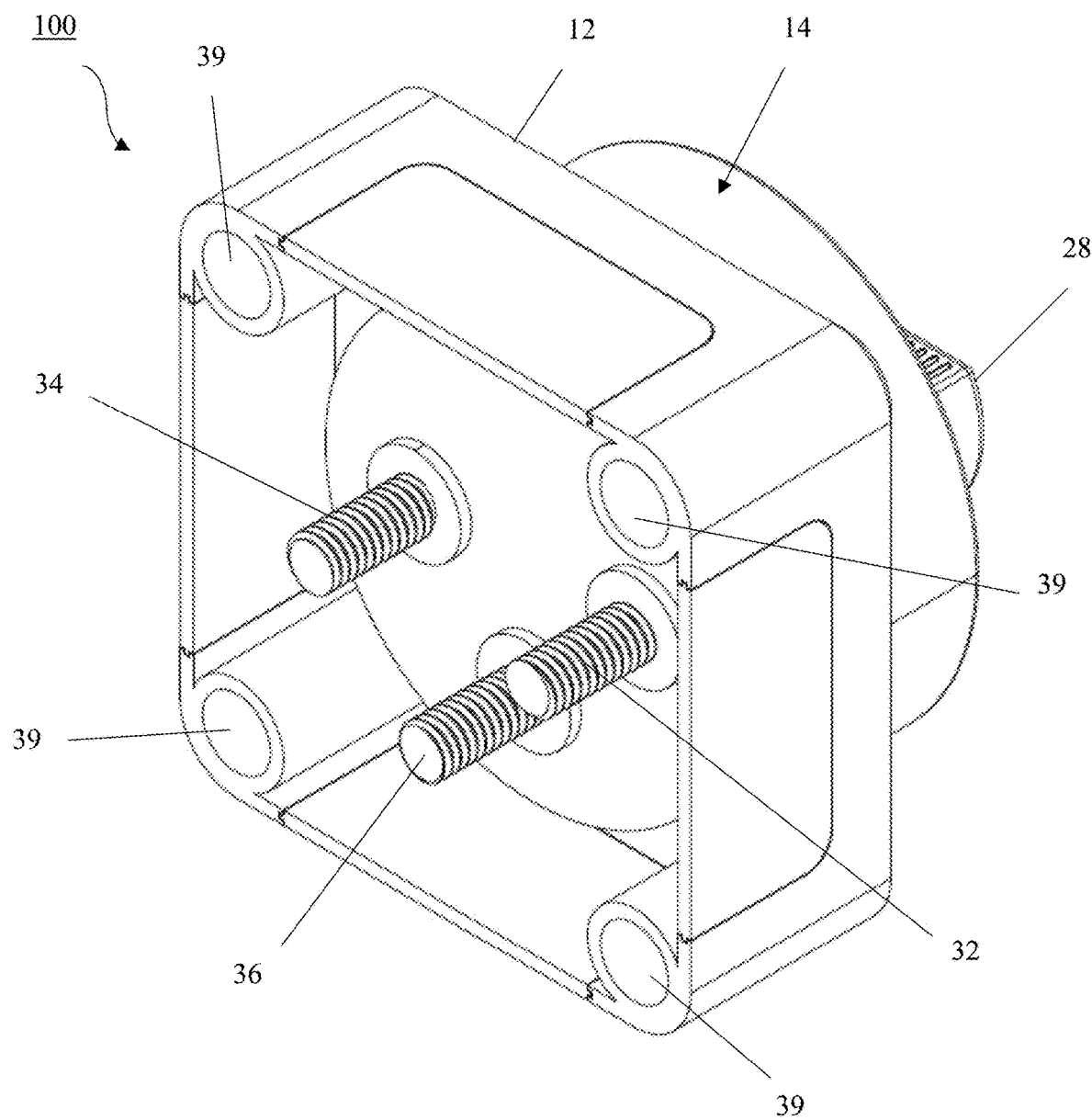
FIG. 1B is a back perspective view of the watercraft battery four-position switch system shown in FIG. 1A.

FIGS. 1A and 1B show a watercraft battery four-position switch system 100 according to one embodiment of the present disclosure. As illustrated in FIG. 1A, the watercraft battery switch system 100 includes a housing 12 having a multi-position switch 28 with an integrated visual indicator 10 mounted thereon. The visual indicator 10 provides an indication to a watercraft user information about the watercraft's batteries. For example, in some embodiments, the visual indicator 10 can indicate to the watercraft user the current position of the switch 28, for example, whether the watercraft's one or more batteries are in use. In further embodiments, the visual indicator 10 can also indicate which battery or combination of batteries are powering the systems of the watercraft. In still further embodiments, the visual indicator 10 can indicate to the watercraft user both the current position of the switch 28 and which battery or combination of batteries are powering the systems of the watercraft.

The housing 12 has a front surface 40 and a plurality of side panels 42 coupled thereto to prevent ingress of particles and moisture. In some embodiments, the housing 12 and system 100 may be configured to achieve an ingress protection (IP) rating suitable for use on a watercraft control panel. For example, the system 100 may have an Ingress Protection code of at least IP67. Such IP rating may be based on applicable IP ratings such as those prepared by the International Electrotechnical Commission ("IEC") Technical Committee 70, for example, IEC 60529, first published in 1976, and modified or amended and supplemented from time to time. The front surface 40 may include a plurality of holes 38 configured for receiving a fastener in order to secure the front surface 40 to the housing 12.

As shown in FIG. 1A, the front surface 40 includes a circular raised portion 14 having a faceplate 15 mounted thereon. The faceplate 15 includes a recess 16 for mounting the switch 28 therein. The faceplate 15 also includes a plurality of labels identifying the various circuit positions of the switch 28. The labels may include numeric characters, alphameric characters, alphanumeric characters, symbols, or any combination thereof. In the illustrated embodiment, the labels include both alphameric and numeric characters and identify four circuit positions: an "OFF" position, a "1" position to indicate battery 1 is powering the watercraft's systems, a "2" position to indicate battery 2 is powering the watercraft's systems, and a "1&2" position to indicate that both battery 1 and battery 2 are powering the watercraft's systems. However, any number (and type) of labels may be used depending on how many circuits and batteries the watercraft is equipped with. In some embodiments, the labels are raised off of the surface of the faceplate 15. For instance, the labels may be raised at least about 1 mm off of the surface of the faceplate 15. In other embodiments, the labels may be raised at least about 2 mm off of the surface of the faceplate 15. In still further embodiments, the labels may be raised about 2.5 mm off of the surface of the faceplate 15.

The switch 28 is configured to be manipulated by a user from one position to another position. For example, the switch 28 is configured to be rotated to the multiple different positions on the faceplate 15 to select the circuit or circuits that are to be engaged. As shown in FIG. 1A, the switch 28 includes a knob 18. The knob 18 may have a gripping area 20 that can be made of plastic or hard rubber to aid the user in turning the knob 18. In some embodiments, the switch 28 is a rotary switch knob configured to rotate to multiple different positions. The switch 28 may rotate one or both of clockwise and counterclockwise and may be unidirectional or bidirectional. In some embodiments, the switch 28 may include a locking mechanism to ensure the knob 18 remains in the selected position.

The switch 28 includes the visual indicator 10 positioned on the knob 18. The visual indicator 10 increases visibility of the positioning of the switch 28 by externally emitting light or other visible indicators. In some embodiments, the visual indicator 10 is a light source. For instance, the visual indicator 10 may be a single LED light. In other embodiments, the visual indicator 10 may include more than one LED light. In some embodiments, the visual indicator 10 can be toggled on or off (for example, emitting light or not) based on whether the switch 28 is turned to a position in which a circuit to one or more batteries is engaged. In further embodiments, a wavelength (for example, color) and/or brightness (for example, magnitude) emitted by the visual indicator 10 can be controlled and varied to convey desired information. A lens (not shown) may be positioned over the visual indicator 10 to protect it from damage and provide ingress protection.

The battery switch system 100 may be configured to position the visual indicator 10 so that the user can easily see (especially when the battery switch system 100 is placed in a remote, dark location) and determine the status of one or more circuits to the watercraft's batteries. The user can determine a status of one or more batteries and which batteries are in use based on position of the switch 28, as indicated by the knob 18, and whether the visual indicator 10 is on, and what color the visual indicator 10 is emitting. In some embodiments, when the visual indicator 10 is a light source, the visual indicator 10 can emit different colors depending on the position of the knob 18. For example, in the illustrated embodiment, the visual indicator 10 may emit a first color when the knob 18 is at the "1" position, a second color when the knob 18 is at the "2" position, and a third color when the knob 18 is at the "1&2" position. The visual indicator 10 may be toggled off when the knob 18 is at the "OFF" position or the visual indicator 10 may emit a fourth color. Each color, for example, the first, second, third and fourth colors, may be different colors (e.g., different wavelengths of visible light) emitted by the visual indicator 10.

In some embodiments, an intensity or brightness of the visual indicator 10 may be varied to provide one or more indications, such as the health of the battery or remaining service life. Indeed, it is often desirable to receive an indication, prior to exhaustion, of the condition of a battery to prevent the unexpected failure of electrical equipment. In one embodiment, when the voltage of the battery drops below a predetermined value, the visual indicator 10 may decrease in intensity, decrease in brightness, flash, and/or blink to indicate that the battery should be replaced. In another embodiment, when the charge of the battery drops below a predetermined value, the visual indicator 10 may decrease in intensity, decrease in brightness, flash, and/or blink to indicate that the battery should be recharged.

The status of the watercraft's one or more batteries and the selection of the particular battery or batteries in use can be indicated by the physical positioning of the knob 18 of the switch 28 and the visual indicator 10. In some embodiments, rotation of the knob 18 so that its longitudinal axis passes through a first position 22, labeled as the "OFF" position in FIG. 1A, may indicate that no batteries of the system are in use. For example, all batteries are switched "off" and no current flows through the switch 28. The visual indicator 10 may be toggled off when in the first position 22. In other embodiments, the visual indicator 10 may emit a first color when in the first position 22.

In further embodiments, rotation of the knob 18 so that its longitudinal axis passes through a second position 24, labeled as the "1" position in FIG. 1A, may indicate that only a first battery of the watercraft system is in use. That is, the first battery is switched "on" and only current from a first battery flows through the switch 28. In some embodiments, the first battery may be the "start" battery for starting the engine of the watercraft. The visual indicator 10 may emit a second color associated with positioning of the knob 18 in the second position 24. In some embodiments, the visual indicator 10 may emit a blue color when the knob 18 is in the second position 24.

In some embodiments, rotation of the knob 18 so that its longitudinal axis passes through a third position 26, labeled as the "1&2" position in FIG. 1A, may indicate that a first battery of the watercraft system is in use and that a second battery of the watercraft system is also in use. In other words, both the first battery and the second battery are switched "on" and current from the first battery and the second battery flow through the switch 28. The visual indicator 10 may emit a third color associated with positioning of the knob 18 in the third position 26. In some embodiments, the visual indicator 10 may emit a green color when the knob 18 is in the third position 26.

In still further embodiments, rotation of the knob 18 so that its longitudinal axis passes through a fourth position 27, labeled as the "2" position in FIG. 1A, may indicate that only a second battery of the watercraft system is in use. In other words, only the second battery is switched "on" and only current from the second battery flows through the switch 28. In some embodiments, the second battery may be the "house" bank battery. The visual indicator 10 may emit a fourth color associated with positioning of the knob 18 in the fourth position 27. In some embodiments, the visual indicator 10 may emit a yellow color when the knob 18 is in the fourth position 27.

The watercraft battery switch system 100 includes a plurality of input and output studs for electrically connecting the switch 28 to the one or more batteries and output source(s). As shown in FIG. 1B, the system 100 includes a first input stud 32, a second input stud 34, and an output stud 36. As will be described in more detail below, the first input stud 32 is electrically engaged with a positive terminal of the first battery and the second input stud 34 is electrically engaged with a positive terminal of the second battery. Thus, when the switch 28 is turned to the second position 24, labeled as the "1" position in FIG. 1A, the first battery gets charged and is in use. When the switch 28 is turned to the fourth position 27, labeled as the "2" position in FIG. 1A, the second battery gets charged and is in use. When the switch 28 is turned to the third position 26, labeled as the "1&2" position in FIG. 1A, both battery banks get charged and are in use.

The output stud 36 is electrically engaged with one or more output sources. For instance, the output stud 36 may be electrically engaged with a control panel of the watercraft, a starter, an alternator, or any combination thereof. In one embodiment, the output stud 26 is electrically engaged with at least the control panel and the starter of the watercraft. In another embodiment, the output stud 26 is electrically engaged with at least the control panel, the starter, and the alternator of the watercraft.

The watercraft battery switch system 100 can be mounted at any location on the watercraft. In this embodiment, the housing 12 may include a base plate (not shown) on the backside for protecting the studs when the system 100 is mounted. In some embodiments, as shown in FIG. 1B, the side panels 42 include a plurality of holes 39 adapted to receive a fastener for securing the housing 12 to the base plate. In the illustrated embodiment, the housing 12 has four holes 39 positioned at each corner of the housing 12. The base plate may include one or more mounting holes for securing the system 100 to the location on the watercraft.

In some embodiments, the watercraft battery switch system 100 is mounted in close proximity to the one or more batteries, for example, in a battery compartment. In other embodiments, the watercraft battery switch system 100 can be positioned on or near a control panel or console of the watercraft, such as the watercraft's cockpit, where a user can easily see it and determine a status of the one or more batteries of the watercraft.

While a single switch 28 of the watercraft battery switch system 100 is depicted and discussed for illustrative purposes, one of ordinary skill in the art will readily appreciate that the watercraft battery switch system 100 may include a plurality of switches 28. For example, at least two, three, four, five, or more switches 28 can be utilized on the watercraft. The plurality of switches 28 may be able to communicate with one another using a Wi-Fi or Bluetooth connection. In addition, each switch 28 may include any number of positions depending on the number of batteries and circuits to which the switch 28 is operatively connected.

Figure 2A:
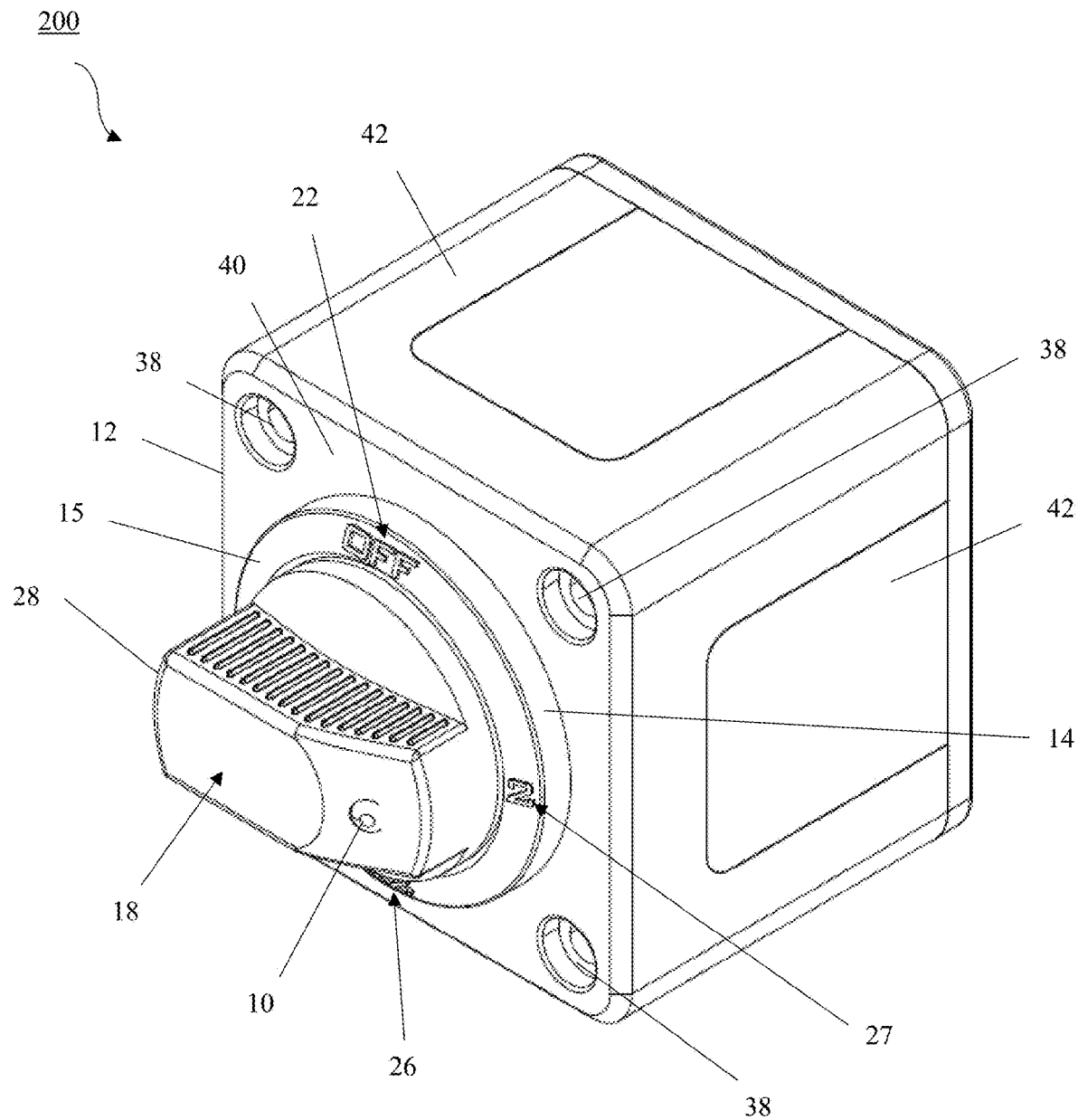
FIG. 2A is a front perspective view of the watercraft battery four-position switch system in accordance with another embodiment of the present disclosure.
Figure 2B:
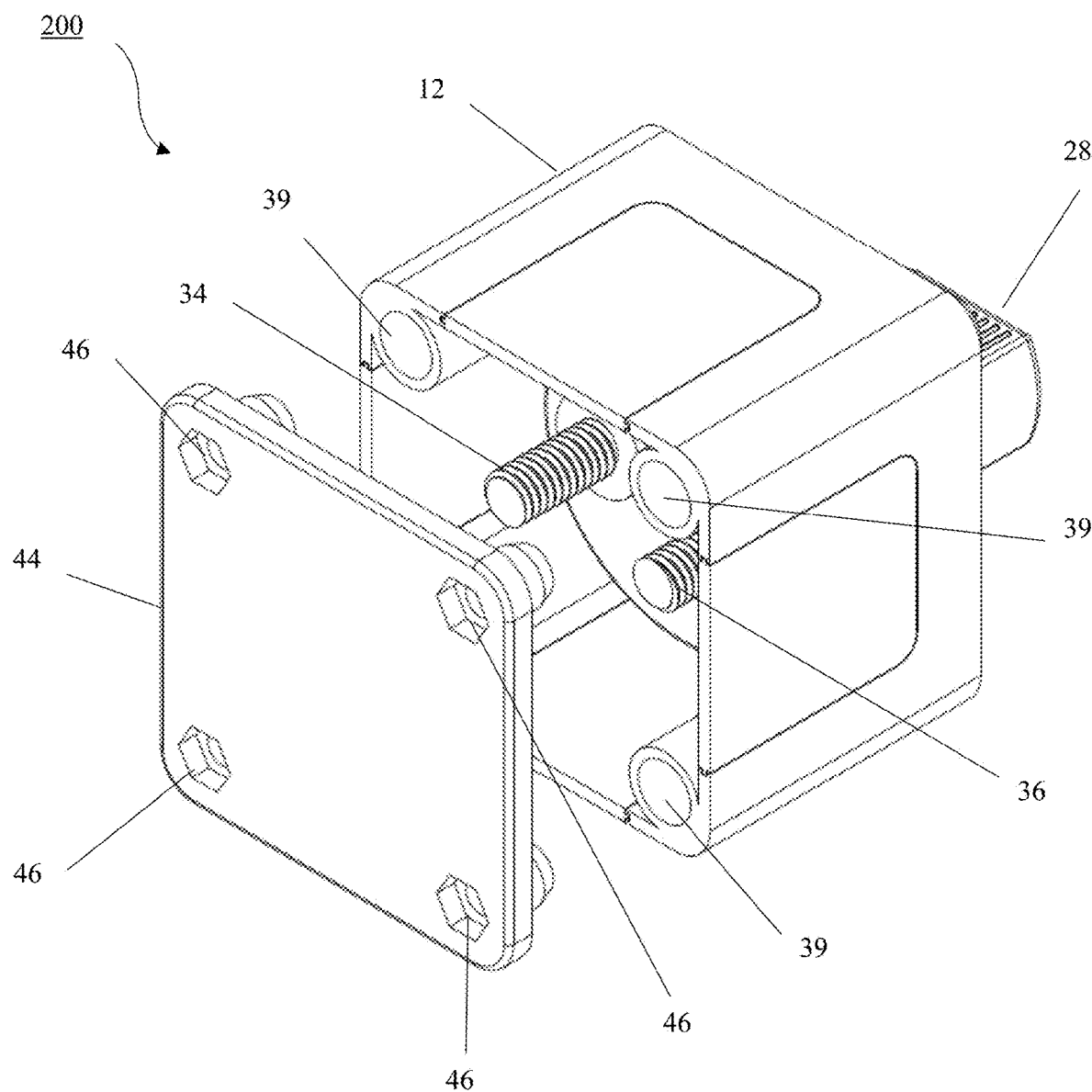
FIG. 2B is a back perspective view of the watercraft battery four-position switch system shown in FIG. 2A.

FIGS. 2A and 2B show a watercraft battery four-position switch system 200 according to another embodiment of the present disclosure. The watercraft battery switch system 200 shown in FIGS. 2A and 2B includes the same features as the watercraft battery switch system 100 shown in FIGS. 1A and 1B; however, the watercraft battery switch system 200 illustrates a smaller version of the system suitable for locations that may not be large enough to fit the watercraft battery switch system 100. In this embodiment, the housing 12 is dimensioned to fit in small and narrow locations.

As shown in FIG. 2B, the housing 12 may include a base plate 44. The base plate 44 may include a plurality of mounting holes 46 for securing the system 200 to the watercraft, as discussed above. The mounting holes 46 may be configured to receive any type of fastener. For example, the system 200 may be secured to the watercraft using screws, bolts, nails, clips, or adhesives. In some embodiments, the fastener is a screw and the mounting holes 46 are molded with screw threads therein to receive screw threads of the screw. In the illustrated embodiment, there are four mounting holes 46; however, any number of holes may be used.

Figure 3A:
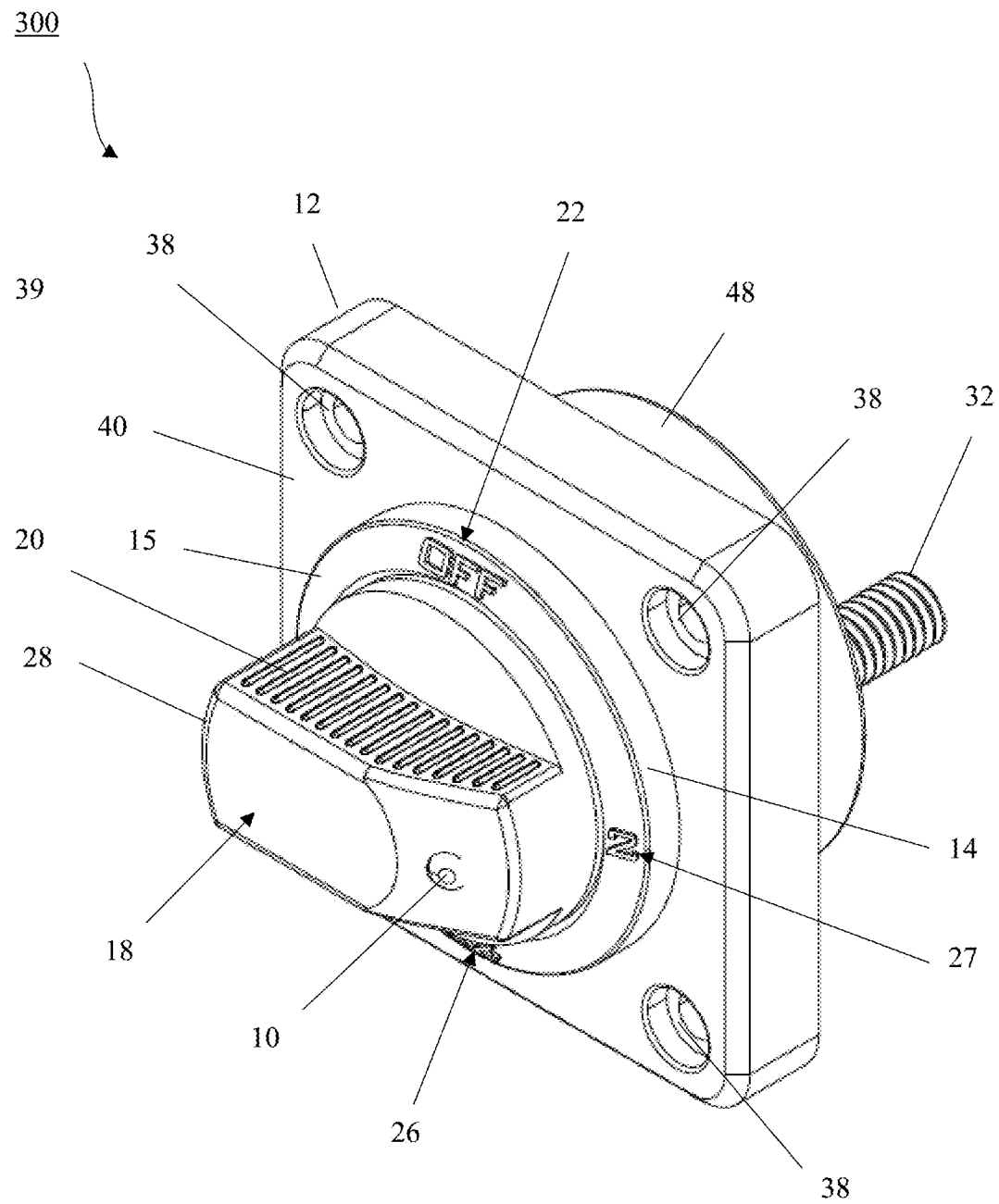
FIG. 3A is a front perspective view of the watercraft battery four-position switch system in accordance with still another embodiment of the present disclosure.
Figure 3B:
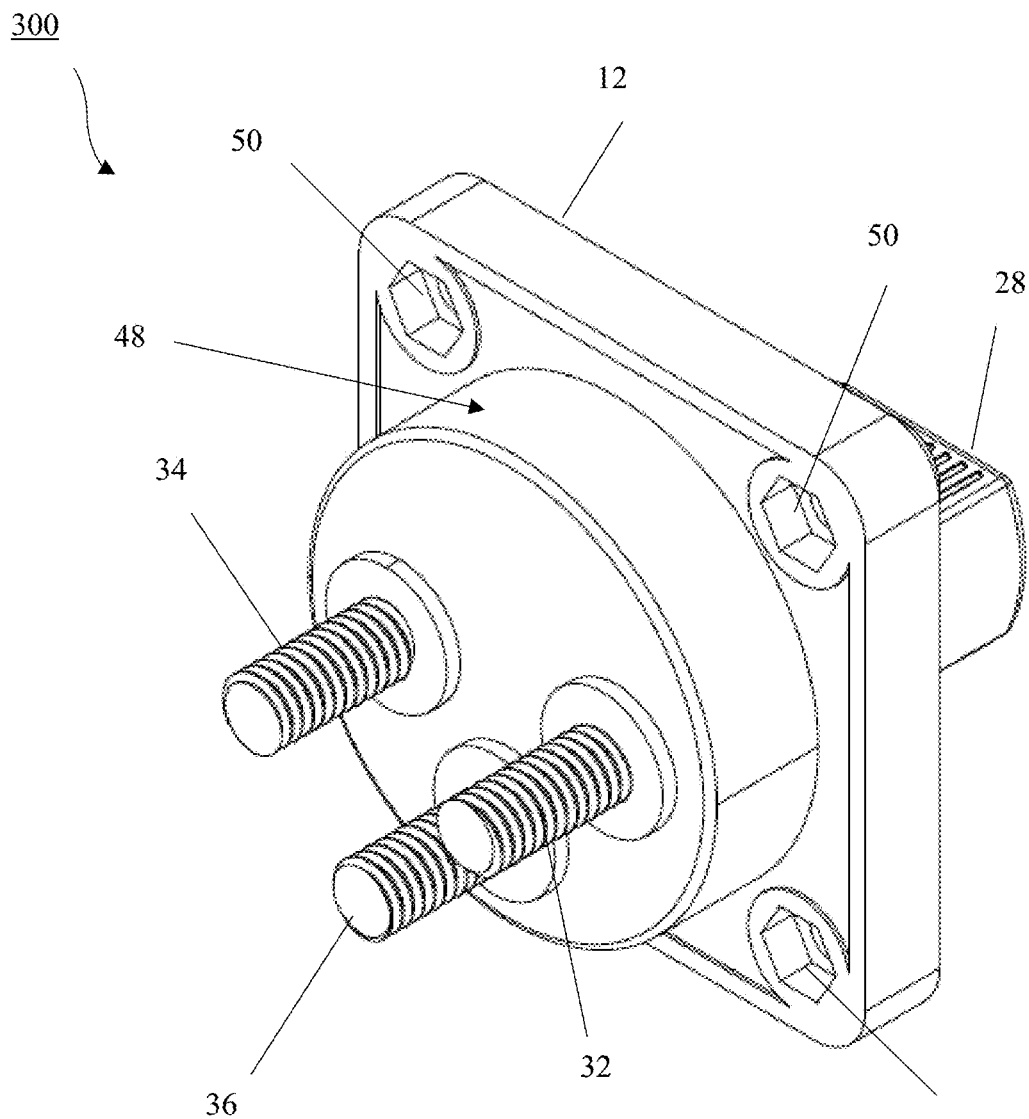
FIG. 3B is a back perspective view of the watercraft battery four-position switch system shown in FIG. 3A.

FIGS. 3A and 3B show a watercraft battery four-position switch system 300 according to still another embodiment of the present disclosure. The watercraft battery switch system 300 shown in FIGS. 3A and 3B includes the same features as the watercraft battery switch system 100 shown in FIGS. 1A and 1B; however, the watercraft battery switch system 300 illustrates a version of the system that can be installed in a substantially flush orientation relative to a surrounding surface, such as a control panel or console of the watercraft.

As shown in FIGS. 3A and 3B, the width of the side panels 42 is substantially smaller than the width of the side panels 42 shown in FIGS. 1A and 1B. This reduces the overall width of the housing 12. Additionally, as shown in FIGS. 3A and 3B, the first input stud 32, the second input stud 34, and the output stud 36 are mounted on a cylindrically shaped projection 48. The projection 48 can be received within a hole on the surface having a shape complementary to the shape of the projection so that the projection 48 sits substantially flush with the surrounding surface, such as the control panel or console. In this embodiment, the housing 12 can be mounted to the surface by inserting fasteners through mounting holes 50.

Figure 4A:
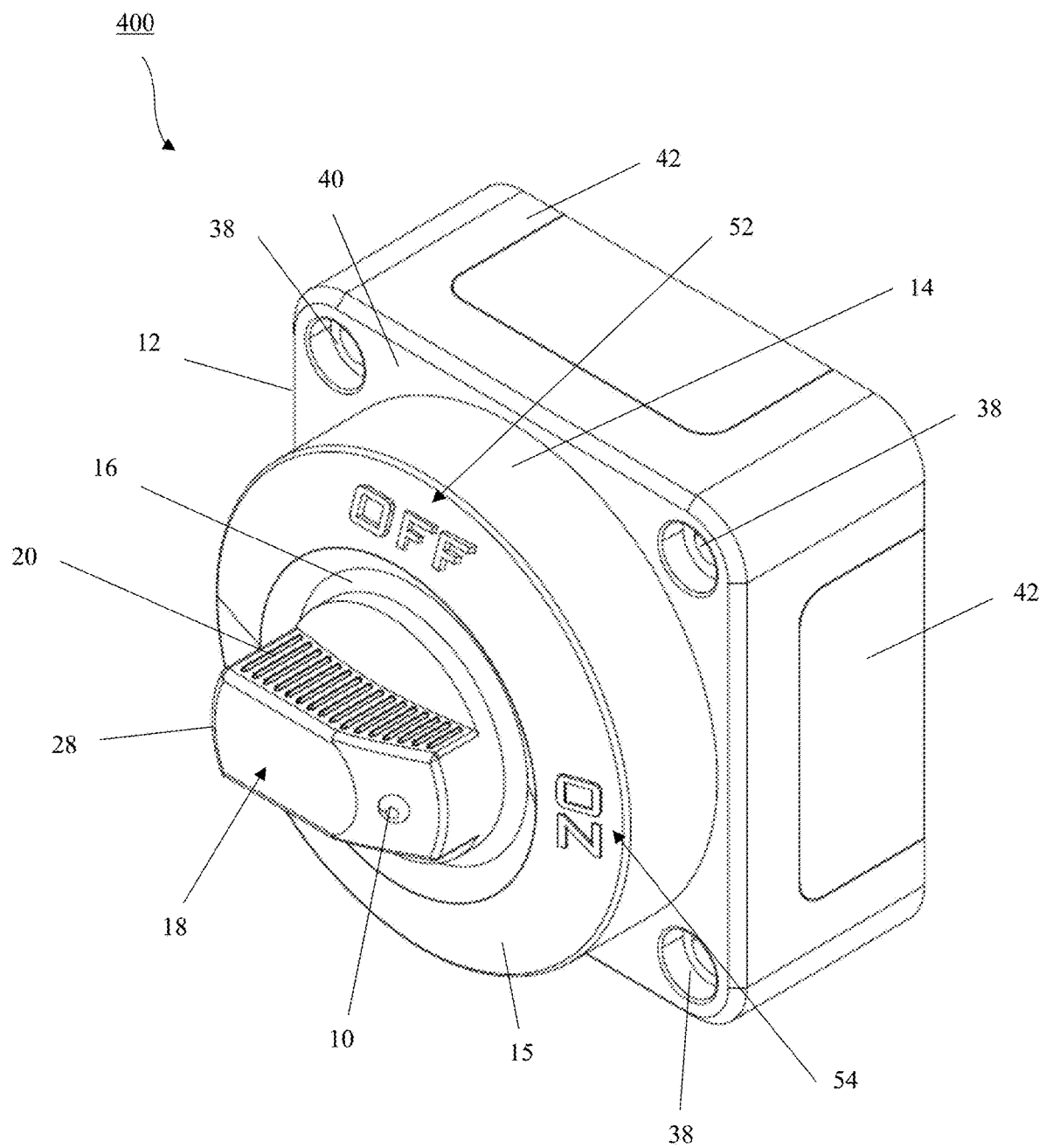
FIG. 4A is a front perspective view of a watercraft battery two-position switch system in accordance with one embodiment of the present disclosure.
Figure 4B:
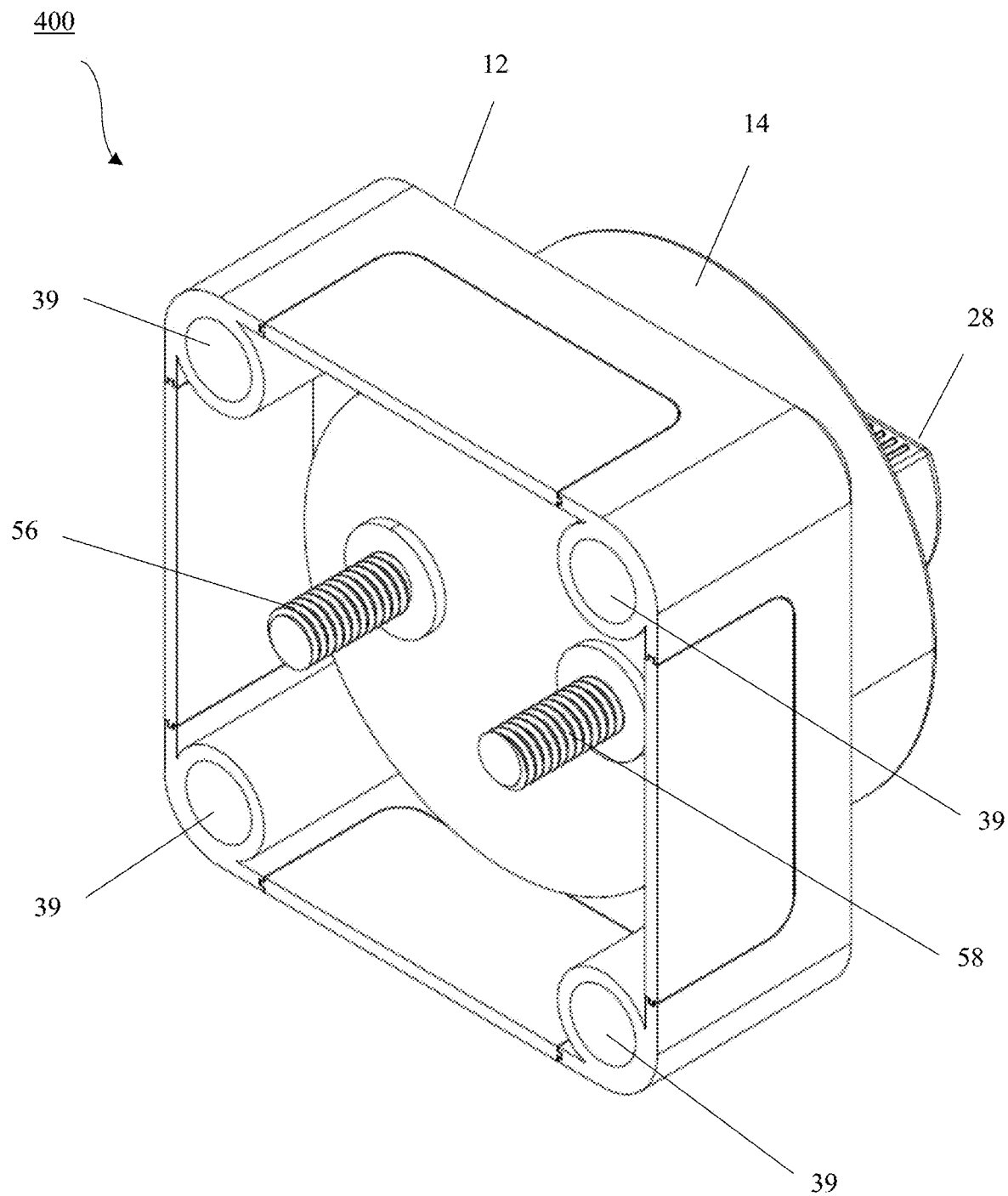
FIG. 4B is a back perspective view of the watercraft battery two-position switch system shown in FIG. 4A.

FIGS. 4A and 4B show a watercraft battery two-position switch system 400 according to one embodiment of the present disclosure. In this embodiment, rather than four positions (as shown in FIGS. 1A-3B), the battery switch system 400 has two positions: an "OFF" position and an "ON" position. This embodiment is particularly advantageous for watercraft operating with a single battery. While the battery switch system 400 has a reduced number of positions, the system 400 operates in the same general manner as the system 100 described above.

Like the systems described above, the watercraft battery two-position switch system 400 can provide the status of the watercraft's battery and the selection of the battery can be indicated by the physical positioning of the knob 18 of the switch 28 and the visual indicator 10. In some embodiments, rotation of the knob 18 so that its longitudinal axis passes through a first position 52, labeled as the "OFF" position in FIG. 4A, may indicate that the battery is not in use. For example, the battery is switched "off" and no current flows through the switch 28. The visual indicator 10 may be toggled off when in the first position 52. In other embodiments, the visual indicator 10 may emit a first color when in the first position 52.

In further embodiments, rotation of the knob 18 so that its longitudinal axis passes through a second position 54, labeled as the "ON" position in FIG. 4A, may indicate that the battery of the watercraft system is in use. That is, the battery is switched "on" and current from the battery flows through the switch 28. The visual indicator 10 may emit a second color associated with positioning of the knob 18 in the second position 54. In some embodiments, the visual indicator 10 may emit a blue or green color when the knob 18 is in the second position 54.

As shown in FIG. 4B, because the switch 28 is configured for a single battery, the watercraft battery switch system 400 includes one input stud and one output stud for electrically connecting the switch 28 to the battery and output source(s). As shown in FIG. 4B, the system 400 includes a first input stud 56 and an output stud 58. The first input stud 56 is electrically engaged with a positive terminal of the battery. Thus, when the switch 28 is turned to the second position 54, labeled as the "ON" position in FIG. 4A, the battery gets charged and is in use.

Figure 5A:
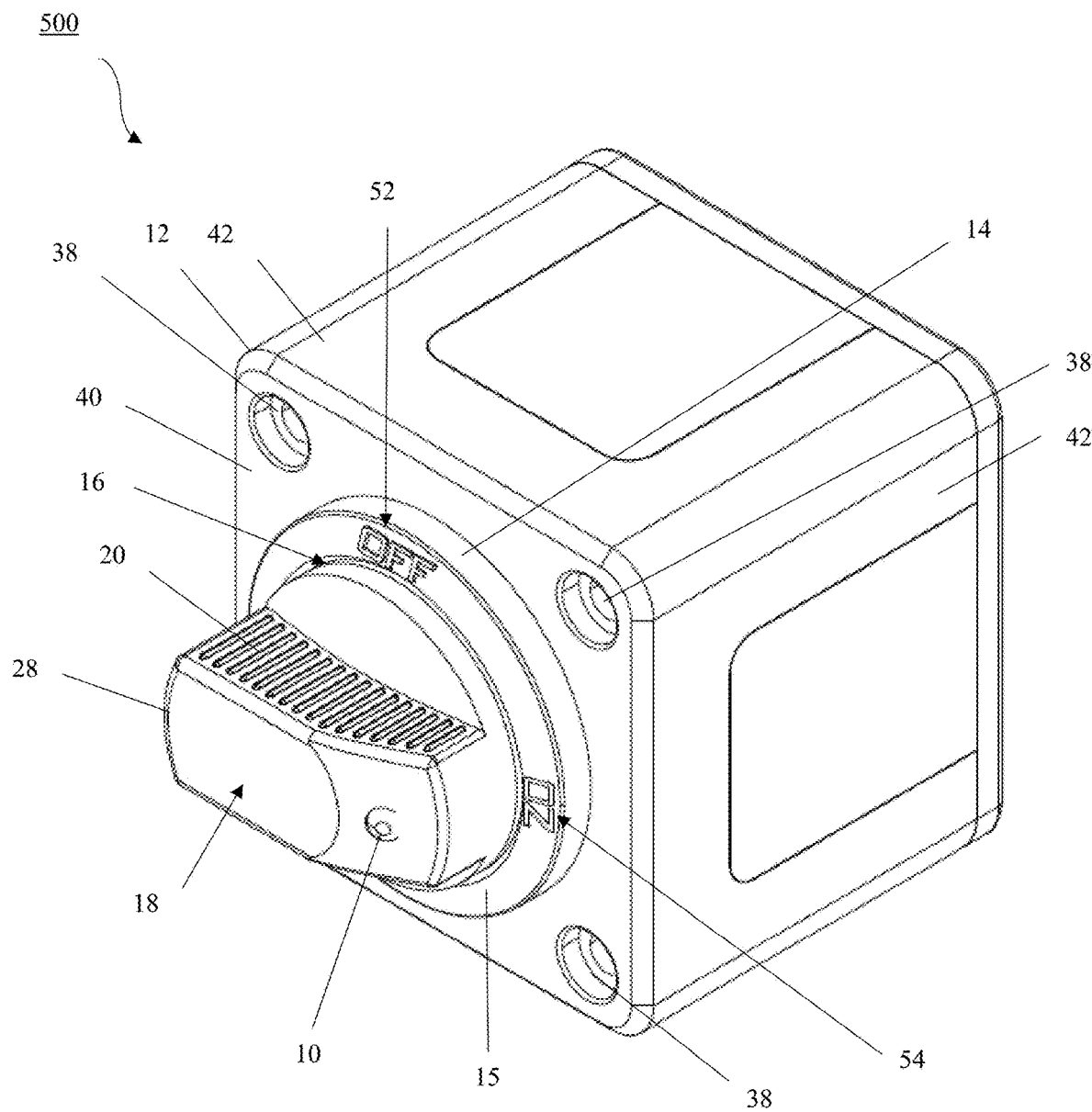
FIG. 5A is a front perspective view of the watercraft battery two-position switch system in accordance with another embodiment of the present disclosure.
Figure 5B:
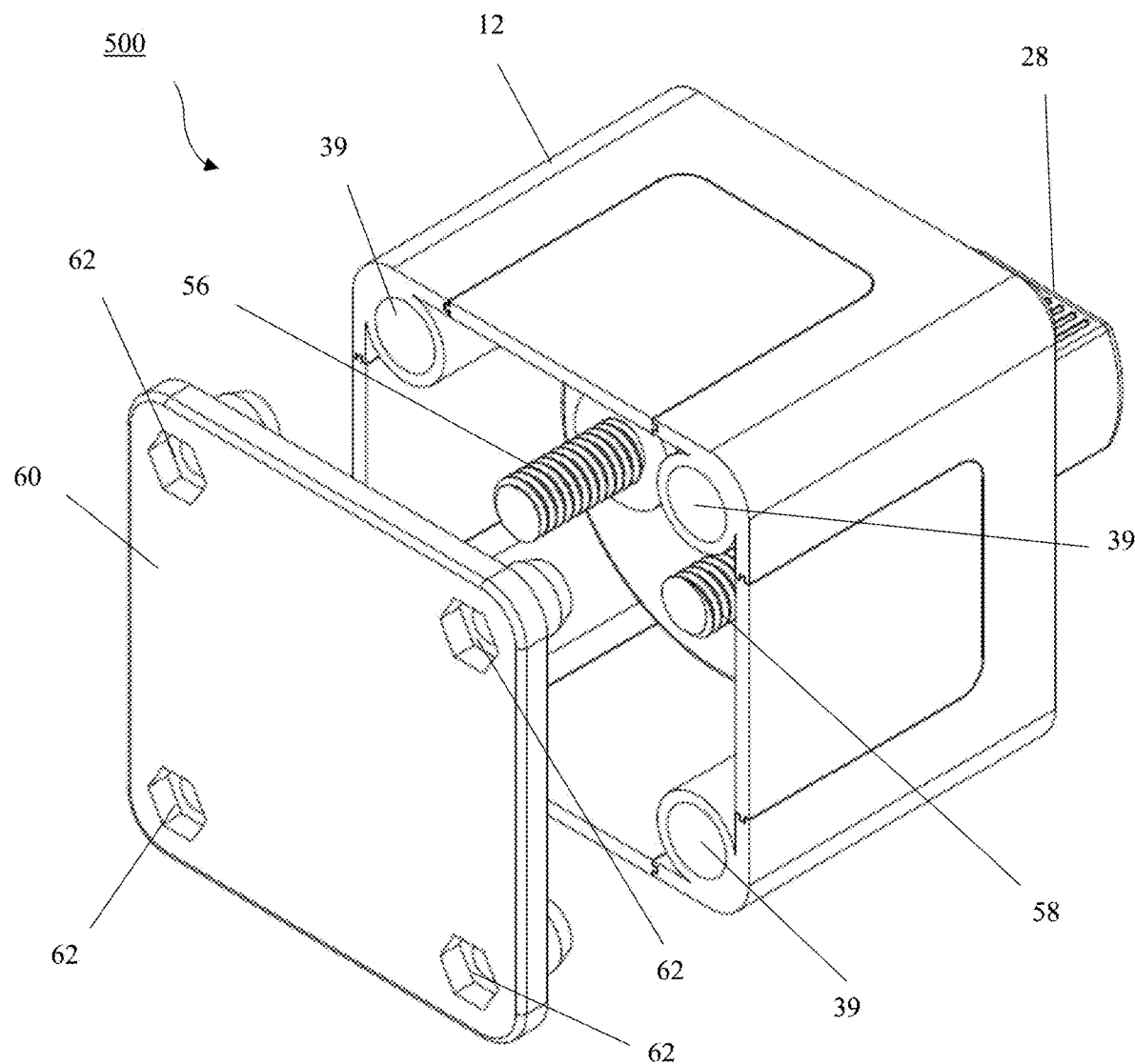
FIG. 5B is a back perspective view of the watercraft battery two-position switch system shown in FIG. 5A.

FIGS. 5A and 5B show a watercraft battery two-position switch system 500 according to another embodiment of the present disclosure. The watercraft battery switch system 500 shown in FIGS. 5A and 5B includes the same features as the watercraft battery switch system 400 shown in FIGS. 4A and 4B; however, the watercraft battery switch system 500 illustrates a smaller version of the system suitable for locations that may not be large enough to fit the watercraft battery switch system 400. In this embodiment, the housing 12 is dimensioned to fit in small and narrow locations.

As shown in FIG. 5B, the housing 12 may include a base plate 60. The base plate 60 may include a plurality of mounting holes 62 for securing the system 500 to the watercraft, as discussed above. The mounting holes 62 may be configured to receive any type of fastener. For example, the system 500 may be secured to the watercraft using screws, bolts, nails, clips, or adhesives. In some embodiments, the fastener is a screw and the mounting holes 62 are molded with screw threads therein to receive screw threads of the screw. In the illustrated embodiment, there are four mounting holes 62; however, any number of holes may be used.

Figure 6A:
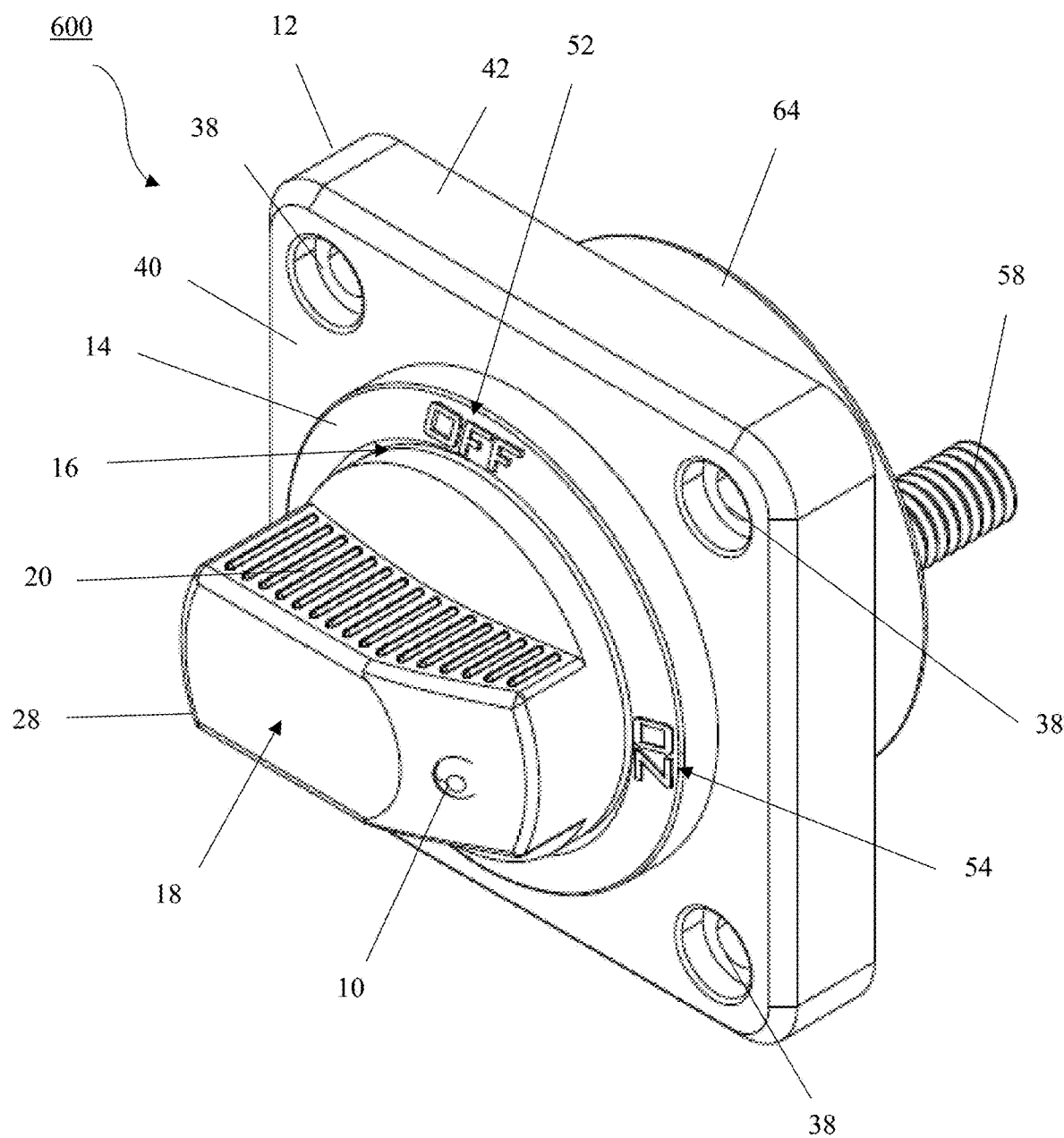
FIG. 6A is a front perspective view of the watercraft battery two-position switch system in accordance with still another embodiment of the present disclosure.
Figure 6B:
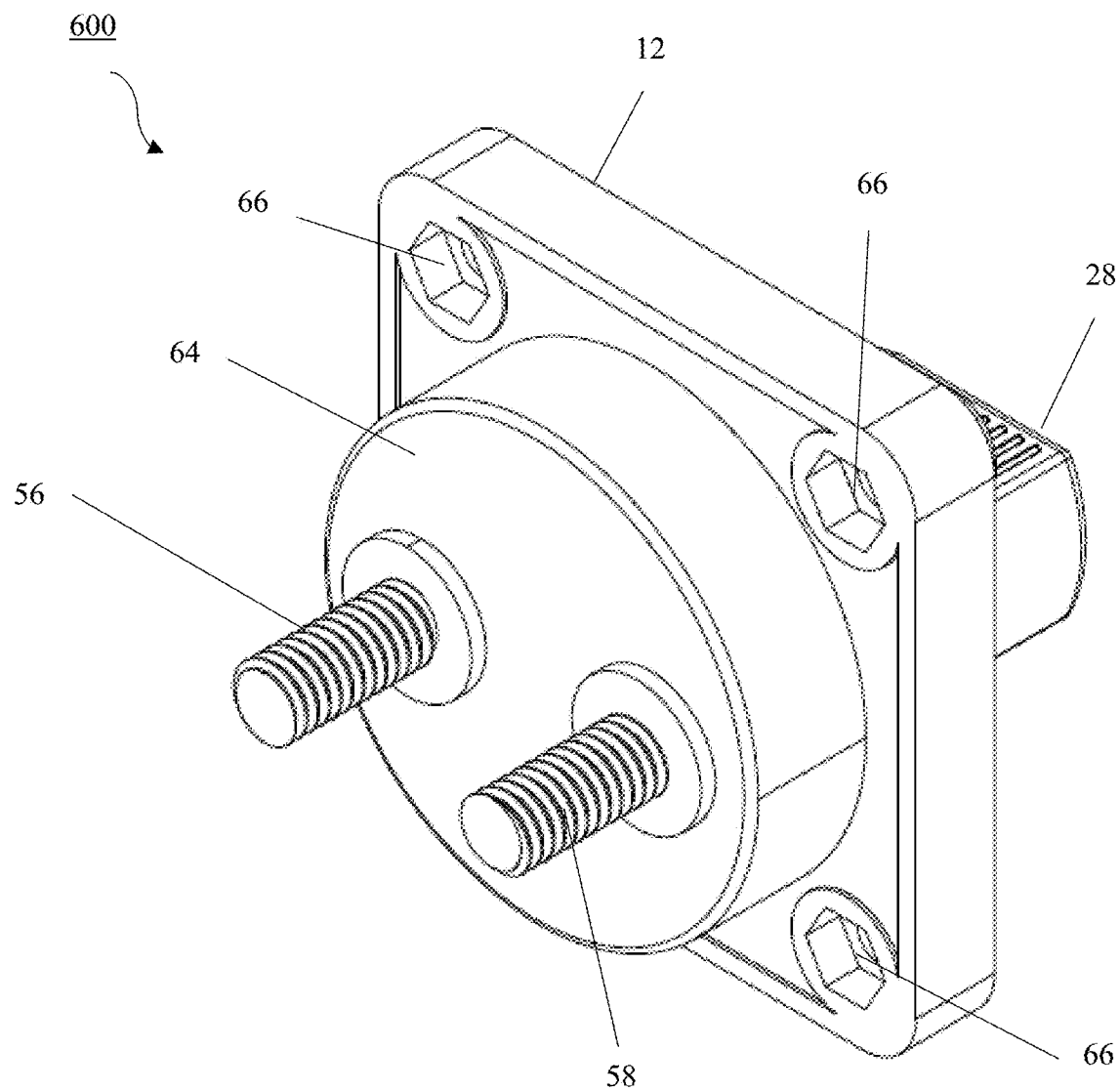
FIG. 6B is a back perspective view of the watercraft battery two-position switch system shown in FIG. 6A.

FIGS. 6A and 6B show a watercraft battery two-position switch system 600 according to still another embodiment of the present disclosure. The watercraft battery switch system 600 shown in FIGS. 6A and 6B includes the same features as the watercraft battery switch system 400 shown in FIGS. 4A and 4B; however, the watercraft battery switch system 600 illustrates a version of the system that can be installed in a substantially flush orientation relative to a surrounding surface, such as a control panel or console of the watercraft.

The watercraft battery switch system 600 can be installed in a similar fashion as the watercraft battery switch system 300 described above. For example, the input stud 56 and the output stud 58 can be mounted on a cylindrically shaped projection 64. The projection 64 can be received within a hole on the surface having a shape complementary to the shape of the projection so that the projection 64 sits substantially flush with the surrounding surface, such as the control panel or console. In this embodiment, the housing 12 can be mounted to the surface by inserting fasteners through mounting holes 66.

Figure 7:
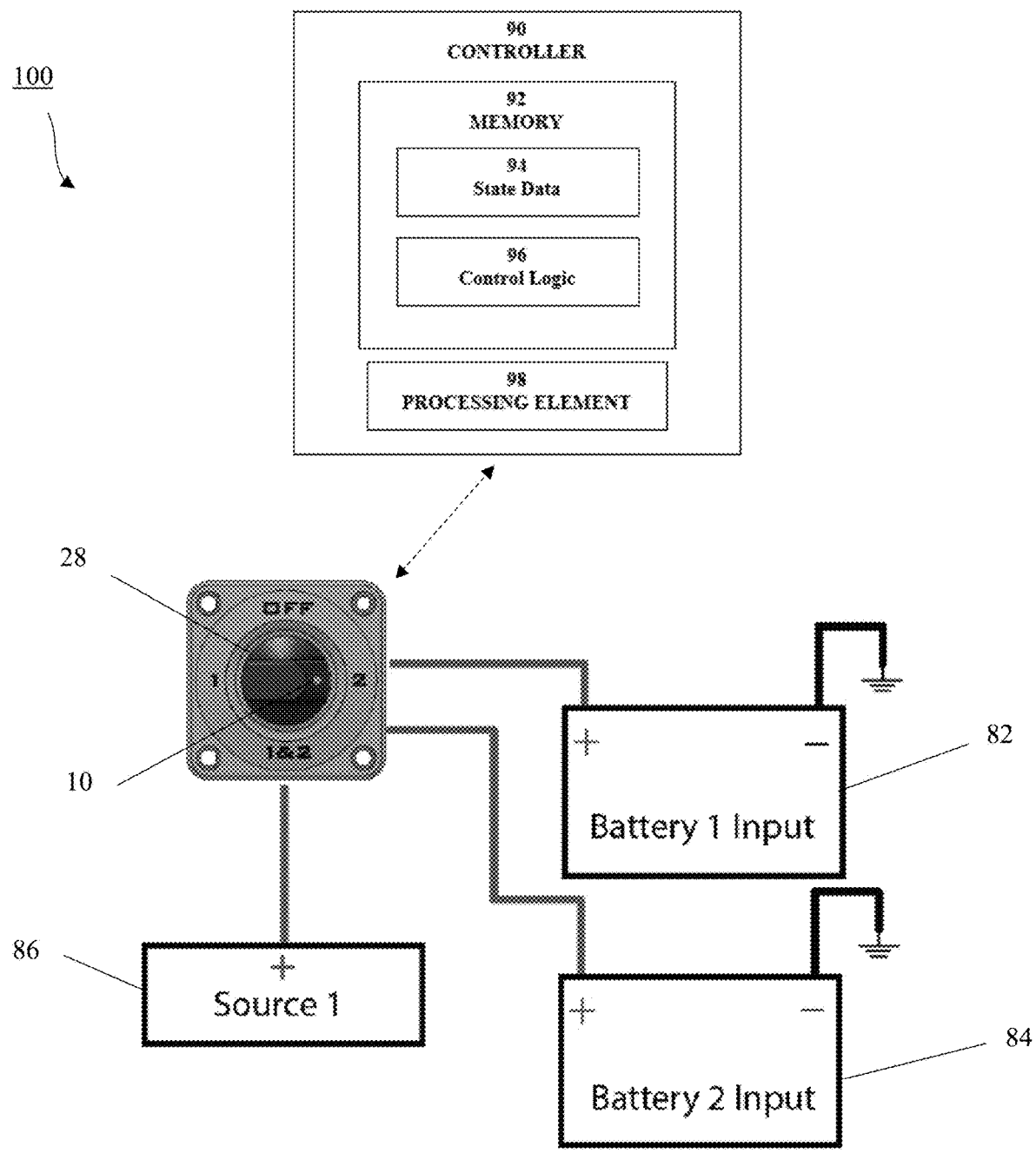
FIG. 7 is a schematic view showing the operation of the watercraft battery four-position switch system in accordance with one embodiment of the present disclosure.
Figure 8:
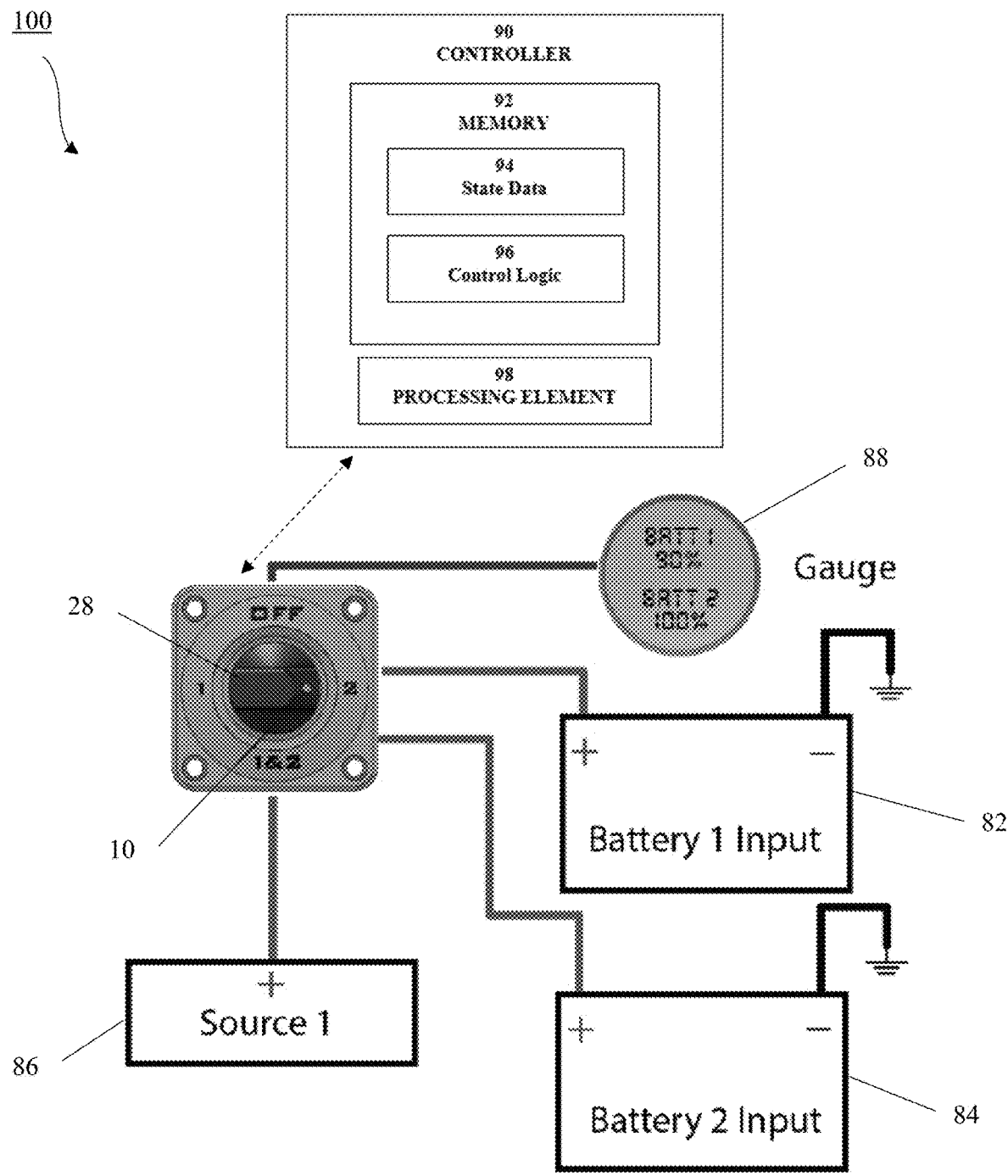
FIG. 8 is a schematic view showing the operation of the watercraft battery four-position switch system in accordance with another embodiment of the present disclosure.

FIGS. 7 and 8 show schematic diagrams of the operation of the watercraft battery four-position switch systems described above. While the operational scheme described in FIGS. 7 and 8 apply to all of the watercraft battery four-position switch systems described above, for illustrative purposes, the watercraft battery four-position switch system 100 will be described with respect to FIGS. 7 and 8. As illustrated in FIG. 7, the switch 28 and visual indicator 10 of the watercraft battery four-position switch system 100 are operatively connected to a first battery 82, a second battery 84, and an output source 86. The switch 28 and visual indicator 10 of the watercraft battery four-position switch system 100 are also operatively connected to a controller 90. In some embodiments, the controller 90 is coupled communicatively to (for example, receive inputs from and provide outputs/signals to) the switch 28, the visual indicator 10, and the other components of the system 100, such as the batteries 82, 84 and the output source 86. In this embodiment, the components may be communicatively coupled via conductive means or via short-range communication protocol, such as Bluetooth®.

The batteries 82, 84 are operatively connected to the switch 28 via the input studs described above. For example, the first input stud 32 on the switch 28 is electrically connected to a positive terminal of the first battery 82 (e.g., via wiring or a cable that provides a positive current) and the second input stud 34 is electrically connected to a positive terminal of the second battery 84 (e.g., via wiring or a cable that provides a positive current). The output source 86 is operatively connected to the switch 28 via the output stud described above. For instance, the output stud 36 is electrically connected to one or more output sources 86 (e.g., via wiring or a cable), such as a control panel, a starter, an alternator, or other resources on the watercraft.

The controller 90 processes, analyzes, and communicates incoming data from the switch 28. In some embodiments, the controller 90 is configured to receive signals from the switch 28 indicating a physical position of the switch 28, generate a visual indicator signal based on the signals received from the switch 28, and provide the visual indicator signal to the visual indicator 10.

In some embodiments, the controller 90 includes control logic 96 for generally controlling the operation of the controller 90 and state data 94 related to information (for instance, measurements) received from the batteries 82, 84, the switch 28, and potentially other resources on the watercraft to which the controller 90 is coupled. The control logic 96 and the state data 94 can be implemented in software, hardware, firmware, or any combination thereof. In the controller 90 illustrated in FIGS. 7 and 8, the control logic 96 and the state data 94 are implemented in software and stored in memory 92 of the controller 90. Memory 92 may include, for example, electronic memory devices, such as random-access memory (RAM), read-only memory (ROM), programmable read-only memory (PROM), electrically erasable programmable read-only memory (EEPROM), and flash memory, and electro-mechanical memory, which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, or Serial Advanced Technology Attachment (SATA), or a variation or enhancement thereof, or a fiber channel-arbitrated loop (FC-AL) interface. Additionally, the control logic 96, when implemented in software, can be stored and transported on any computer-readable medium for use by or in connection with an instruction execution apparatus that can fetch and execute instructions.

The control logic 96 can include instructions for controlling and implementing operations and functionality of the watercraft battery four-position switch 100 and/or its resources, such as controller 90. Instructions executed by the controller 90 may include, for instance, instructions for toggling a power signal to the visual indicator 10 based on whether the watercraft's batteries are in use, and for associating a distinct color with each position of the switch 28. The controller 90 may execute the instructions to toggle the visual indicator 10 off when the batteries are not being used to power any watercraft systems, and to toggle the visual indicator 10 on when one or more of the batteries are in use to power the watercraft systems.

In some embodiments, the controller 90 may execute instructions to receive a switch position signal indicating a physical position of the switch 28. A switch position signal can be based on whether the one or more batteries is in use based on a position of the switch 28 as indicated by whether a switch circuit coupling the controller 90 with one or more positions of the switch 28 is open or closed (e.g., whether current or voltage is detected at an input of the controller). When the switch circuit is open, the controller 90 may determine that the one or more batteries is not in use. When the switch circuit is closed, the controller 90 may determine that the one or more batteries is in use.

A switch position signal also can be based on whether a system circuit coupling one or more batteries of the watercraft with one or more systems the one or more batteries powers is open or closed (e.g., whether current or voltage is detected at an input of the controller 90). When the system circuit is open, the controller 90 may determine that the one or more batteries is not in use. When the system circuit is closed, the controller 90 may determine that the one or more batteries is in use.

The controller 90 may further execute instructions to generate a visual indicator signal that will cause the visual indicator 10 to emit a color associated with the current position of the switch 28. In some embodiments, the controller 90 may also execute instructions to generate a visual indicator signal that will cause the visual indicator 10 to decrease in intensity, decrease in brightness, flash, and/or blink to indicate that the battery should be replaced or recharged.

In some embodiments, the state data 94 includes information (for example, measurements) received from the batteries 82, 84, the switch 28, the visual indicator 10, and potentially other resources of the system 100 to which the controller 90 is coupled. The state data 94 may include data indicative of one or more of the following: a state of the batteries 82, 84; a position of the switch 28; whether the visual indicator 10 is toggled on or off; an intensity or brightness of the visual indicator 10; a color of the visual indicator 10; and other data ascribed as being used by the system 100 or controller 90 herein to achieve the functionalities described herein.

The controller 90 may further include at least one conventional processing element 98, which includes processing hardware for executing instructions stored in the memory 92. As an example, the processing element 98 may include a central processing unit (CPU) or a digital signal processor (DSP). The processing element 98 communicates to and drives the other elements within the controller 90 via a local interface, which can include at least one bus.

As shown in FIG. 8, the watercraft battery four-position switch system 100 may also include a battery charge indicator 88. The battery charge indicator 88 may provide a visual indication of the level of charge of each of the batteries connected in the system 100. In some embodiments, the battery charge indicator 88 provides a visual representation, such as a percentage, of the remaining charge of the battery. For example, as illustrated in FIG. 8, the battery charge indicator 88 indicates that the first battery 82 (labeled as Battery 1) has a remaining charge of 90 percent and the second battery 84 (labeled as Battery 2) is fully charged at 100 percent. In other embodiments, the battery charge indicator 88 may utilize a plurality of lights (such as LEDs) to indicate the charge of each battery. For example, when the battery voltage is relatively low, a red light may be illuminated. When the battery voltage is relatively high, a green light may be illuminated. An orange color may be used to indicate a transitional state of charge.

Figure 9:
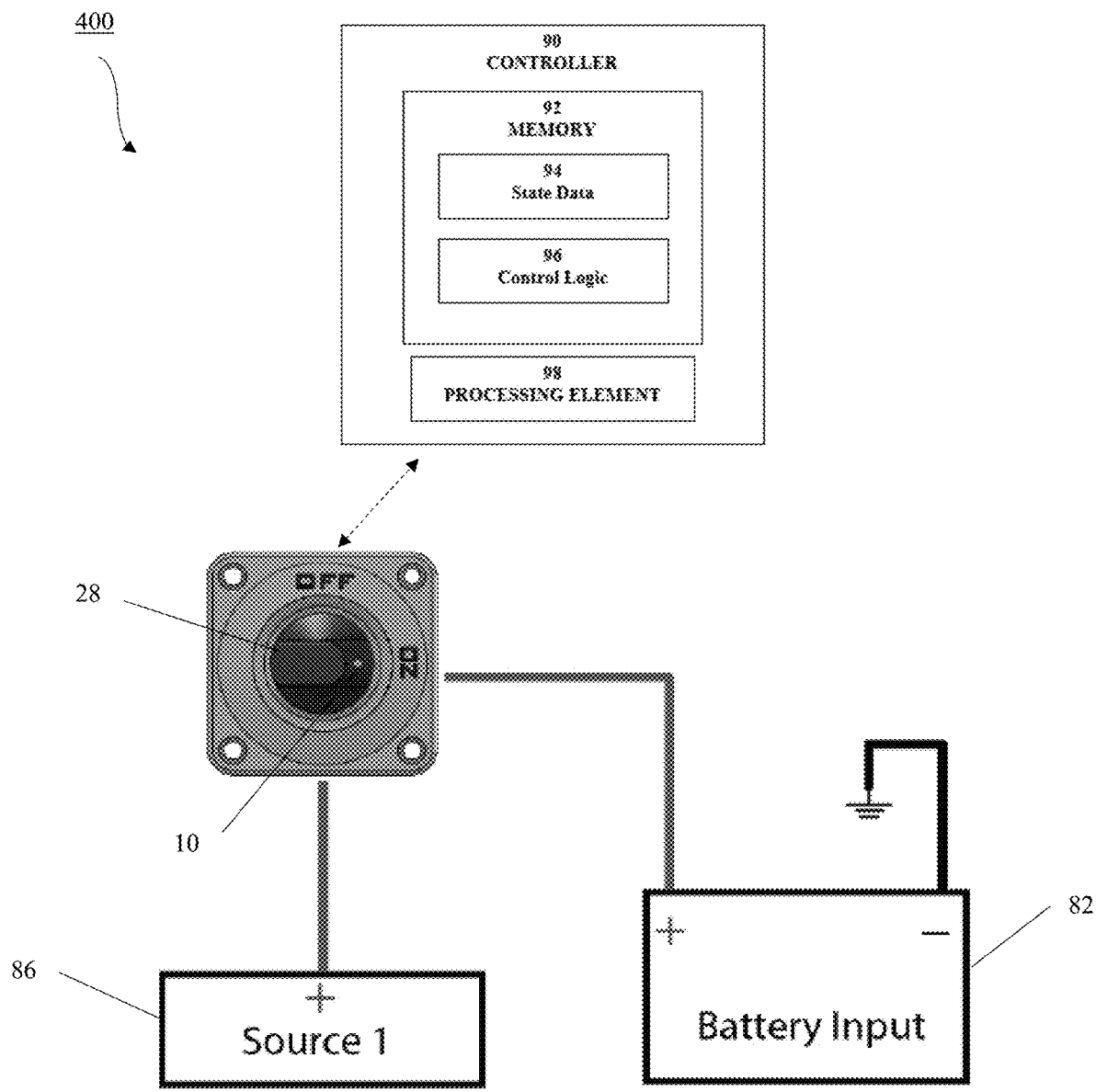
FIG. 9 is a schematic view showing the operation of the watercraft battery two-position switch system in accordance with one embodiment of the present disclosure.
Figure 10:
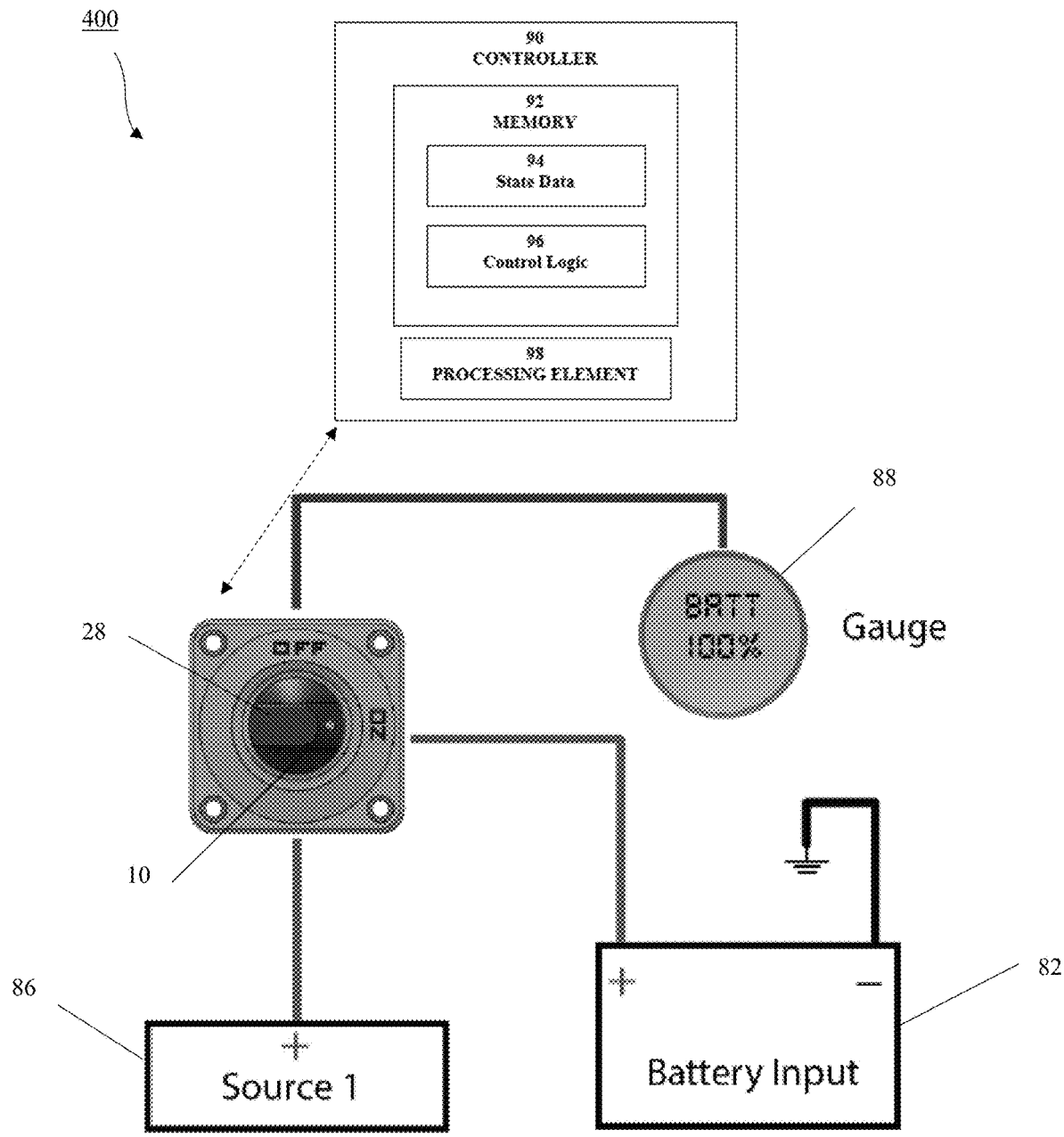
FIG. 10 is a schematic view showing the operation of the watercraft battery two-position switch system in accordance with another embodiment of the present disclosure.

FIGS. 8 and 9 show schematic diagrams of the operation of the watercraft battery two-position switch systems described above. The watercraft battery two-position switch systems operate in a similar manner as the watercraft battery four-position switch systems described above with respect to FIGS. 7 and 8. However, in this embodiment, the switch 28 and visual indicator 10 of the watercraft battery four-position switch system 400 are operatively connected to a single battery, for example, the first battery 82, and the output source 86. While the operational scheme described in FIGS. 8 and 9 apply to all of the watercraft battery two-position switch systems described above, for illustrative purposes, the watercraft battery two-position switch system 400 will be described with respect to FIGS. 8 and 9.

In this embodiment, the battery 82 is operatively connected to the switch 28 via the input stud described above. For example, the input stud 56 on the switch 28 is electrically connected to a positive terminal of the first battery 82 (e.g., via wiring or a cable). The output source 86 is operatively connected to the switch 28 via the output stud described above. For instance, the output stud 58 is electrically connected to one or more output sources 86 (e.g., via wiring or a cable), such as a control panel, a starter, an alternator, or other resources on the watercraft. As shown in FIG. 9, the watercraft battery two-position switch systems may also include the battery charge indicator 88.

The various components of the systems described herein may be constructed or manufactured from materials, such as various polymers, plastics, stainless steel, aluminum, and combinations thereof. Similarly, the various parts described herein may be constructed according to various manufacturing methods including injection molding, milling, forging, extrusion, pressing, 3D printing, and other related manufacturing methods.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A switch system for a battery, comprising:
   a switch comprising a visual indicator positioned thereon, wherein the visual indicator is configured to provide an indication of whether current from the battery is flowing through the switch;
   a controller coupled to the switch and the visual indicator, wherein the controller is configured to execute instructions stored in memory to:
   receive, at the controller, a switch position signal indicating a physical position of the switch;
   generate, at the controller, an indicator signal based on the switch position signal, wherein the indicator signal comprises an indication that the visual indicator is to be turned on if current from the battery is flowing through the switch and the visual indicator is to be turned off if no current is flowing through the switch; and
   communicate, from the controller, the indicator signal to the visual indicator.

2. The switch system of claim 1, wherein the indicator signal further comprises an indication of a color of the visual indicator if the visual indicator is to be turned on.

3. The switch system of claim 1, wherein the visual indicator is a LED light source.

4. The switch system of claim 1, wherein the switch comprises an input stud, the input stud configured to be operatively connected to a battery.

5. The switch system of claim 1, wherein the switch comprises an output stud, the output stud configured to be operatively connected to an output source.

6. The switch system of claim 5, wherein the output source comprises a control panel, a starter, an alternator, or any combination of the foregoing.

7. A switch system for a multi-battery powered watercraft, comprising:
   a switch comprising a selector knob configured for rotation to a plurality of positions, each position corresponding to one of a plurality of battery circuits;
   a visual indicator positioned on the switch, wherein the visual indicator is configured to provide an indication of whether current from at least one of the battery circuits is flowing through the switch;
   a controller coupled to the switch and the visual indicator, wherein the controller is configured to execute instructions stored in memory to:
   receive, at the controller, a switch position signal indicating the position of the selector knob;
   generate, at the controller, an indicator signal based on the switch position signal, wherein the indicator signal comprises an indication that the visual indicator is to be turned on if current from the selected battery circuit is flowing through the switch and an indication of a color of the visual indicator if the visual indicator is to be turned on; and
   communicate, from the controller, the indicator signal to the visual indicator.

8. The switch system of claim 7, wherein the visual indicator is a LED light source.

9. The switch system of claim 8, wherein the visual indicator is configured to emit a different color for each selected battery circuit.

10. The switch system of claim 7, wherein the plurality of battery circuits comprises a first circuit operatively connected to a first battery, a second circuit operatively connected to a second battery, a third circuit operatively connected to the first battery and the second battery, and an open circuit disconnected from both the first battery and the second battery.

11. The switch system of claim 7, further comprising a battery charge indicator operatively connected to the switch.

12. The switch system of claim 7, wherein the system has an Ingress Protection code of at least IP67.

13. The switch system of claim 7, wherein the switch comprises a faceplate, the faceplate comprising labels affixed thereto for each of the plurality of positions.

14. The switch system of claim 13, wherein the labels are raised off the faceplate by at least about one millimeter.

15. The switch system of claim 10, wherein the switch further comprises a first input stud configured to be operatively connected to the first battery to form the first circuit and a second input stud configured to be operatively connected to the second battery to form the second circuit.

16. A switch system for a multi-battery powered watercraft, comprising:
 a switch comprising a selector knob configured for rotation to a plurality of positions, each position corresponding to one of a plurality of battery circuits, the plurality of battery circuits comprising a first circuit operatively connected to a first battery, a second circuit operatively connected to a second battery, and a third circuit operatively connected to the first battery and the second battery;
 a light source positioned on the switch, wherein the light source is configured to provide an indication of whether current from at least one of the battery circuits is flowing through the switch;
 a controller coupled to the switch and the light source, wherein the controller is configured to execute instructions stored in memory to:
  receive, at the controller, a switch position signal indicating the position of the selector knob;
  generate, at the controller, an indicator signal based on the switch position signal, wherein the indicator signal comprises an indication that the light source is to be turned on if current from the selected battery circuit is flowing through the switch and an indication of a color of the light source if the light source is to be turned on; and
  communicate, from the controller, the indicator signal to the light source.

17. The switch system of claim 16, wherein the light source is a LED light source.

18. The switch system of claim 16, wherein the system has an Ingress Protection code of at least IP67.

19. The switch system of claim 16, wherein the light source is configured to emit a different color for each selected battery circuit.

20. The switch system of claim 16, wherein the switch further comprises a first input stud configured to be operatively connected to the first battery to form the first circuit and a second input stud configured to be operatively connected to the second battery to form the second circuit.

* * * * *